United States Patent Office

3,718,433
Patented Feb. 27, 1973

3,718,433
METHOD OF ANALYZING OF AMMONIA, UREA, AND TYROSINE
Robert T. Emmet, Miami, Fla.
(14 Bricin St., Annapolis, Md. 21403)
No Drawing. Continuation-in-part of abandoned application Ser. No. 799,502, Feb. 14, 1969. This application July 26, 1971, Ser. No. 166,272
Int. Cl. G01n 21/22, 33/16
U.S. Cl. 23—230 R
3 Claims

ABSTRACT OF THE DISCLOSURE

A new system of chemical reactions for the analysis for ammonia, urea and tyrosine and also biuret and allantoin in certain solutions. The reactions consist of a chlorination of the nitrogen compound in dilute hypochlorite (OCl$^-$) solution followed by the condensation with phenol to form uniquely absorbing compounds; 630 m$\mu$ for ammonia, 454 m$\mu$ for urea and 375 m$\mu$ for tyrosine. This method provides several procedural advantages especially suited for clinical use.

---

This invention relates to a system of chemical analyses, and more particularly to a new system of chemical reactions for the analysis of ammonia, urea and tyrosine and also biuret and allantoin in certain solutions. This patent application is a continuation-in-part of U.S. patent application Ser. No. 799,502 filed Feb. 14, 1969, by applicant for "Method of Analyzing of Ammonia, Urea and Tyrosine" and now abandoned.

Ammonia has been analyzed in the past by the phenol-hypochlorite method with good sensitivity. However, the terminal solution in this reaction as practiced has been extremely alkaline and, in certain instances such as in body fluids, urea present accordingly changed rapidly to ammonia to cause interference in the color response and a compromised test.

It has more recently become important to estimate tyrosine in urine as an indication of the metabolic disorders in infants known as tyrinosis and phenylketonuria. Present clinical evaluations are done with involved, time consuming, difficult means generally through the use of enzymes and reagents which are not specific for tyrosine.

Direct spectrophometric analysis of ammonia in natural waters, sea water for example, is now done by a phenol-hypochlorite reaction. In natural waters, urea is produced by the metabolism of crustacea and higher animals and by the degradation of purines and pyrimidines which result from the hydrolysis of nucleic acids. Ammonia is produced by the deamination of urea and other amino compounds and is directly produced and absorbed by many living organisms.

In surface waters and nutrient polluted waters where urea and ammonia constitute a major portion of the dissolved inorganic nitrogen, analysis for these compounds would be useful.

At present there are two methods for the analysis of urea in natural waters. One is paper chromatography which requires a lengthy procedure for the concentration of urea.

Another more convenient method is an adaption of the Fearon urea-deacetyl reaction. However, the red signal in this method develops slowly and the acidic terminal solution is difficult to handle. In addition, the calibrations and blank determinations are not carried out in the natural sample where unexpected interferences might be detected.

There are several methods for measuring ammonia in natural waters but they require delicate equipment, extra handling and are not convenient for field use. A rubazoic acid method has been used as well as a phenolhypochlorite method which is very sensitive. Both, however, are lengthy and best suited for dilute waters.

An object of this invention is to provide a hypochlorite-phenol analysis which produces general, blank, and standard samples which develop more strongly colored distinctive signals for urea and ammonia.

Another object of this invention is to provide a more sensitive analysis method which will give determinations for all three components: urea, ammonia, and tyrosine with one set of reagents. Further, the analysis can be simultaneous for urea and tyrosine and also is suitable for detection of biuret.

Yet another object of this invention is to provide a process for the determination of urea and/or ammonia in natural waters which is relatively simple and safe for use by untrained personnel.

Still another object of the invention is to provide a sensitive analysis method for allantoin, biuret, and tyrosine.

To provide a colorimetric method of analysis for combined amines in which the signal interferences are reduced is still another object of this invention.

To provide a clinical sample ammonia procedure unique in that the signal develops with a greater stability in terminal solution than heretofor, is still another object of this invention. Thereby, undesirable interferences from urea, biuret and allantoin which develop an absorbance at 630 m$\mu$ more rapidly in alkaline, terminal hypochlorite-phenol solutions are avoided.

Other objects and attendant advantages of the invention will become more readily apparent and understood from the following detailed specification.

In aqueous solutions of urea, tyrosine and ammonia which are more concentrated than 20 microgram atoms of urea, tyrosine or ammonia per liter, the colored signals can be readily formed by adding the essential reagents sodium hypochlorite, NaOCl, and phenol, over a wide range of concentrations and relative proportions. The NaOCl, which should be added first, should be mixed with the nitrogen-containing solution at a pH of between 4 and 8 so that the chlorination reactions, discussed hereinafter, can occur. The phenol which should be added second, should be mixed with the resultant solution of the first reagent addition at a pH of between 8 and 11 which is high enough for the colored compounds to develop and be stable.

The colored compounds are phenolic derivatives of urea, tyrosine and ammonia. These derivatives have broad relative absorbancy maxima at 454 m$\mu$, 375 m$\mu$ and 630 m$\mu$, respectively, and since the amplitudes of these maxima expressed as absorbency are proportional to the respective concentrations of the nitrogen-containing compounds in the samples, these signals may be used for quantitative analysis of these compounds.

More specifically, it is found that the chlorination reactions occur at room temperature, in the said more concentrated nitrogen-containing solutions, if NaOCl is mixed with the sample to achieve concentrations between 0.1 and 0.001% or $(1 \times 10^{-2 \pm 1})\%$ of free chlorine, where percent of free chlorine means the reactive chlorine or the weight of the chlorine in the NaOCl reagent added, times 100, divided by the weight of the sample.

The NaOCl should be mixed with the sample for between 1 and 40 seconds at a pH between 4 and 8 to obtain adequate chlorination of the nitrogen containing compounds. Also it is found that in the more concentrated nitrogen-containing solutions, it is necessary for phenol to be mixed with the resultant solution of the first reagent addition to achieve concentrations between 1.0 and 0.01% or $(1 \times 10^{-1 \pm 1})\%$ phenol at a pH between 8 and 11 so that the said phenolic derivatives of urea, tyrosine, and ammonia can form and be stable.

In more dilute solutions of urea, tyrosine or ammonia than about 20 microgram atoms of urea, tyrosine or ammonia nitrogen per liter, such as in natural waters, in order to maximize the precision and sensitivity and minimize the blank, all of which are required in accurate analysis, the conditions must be more carefully controlled with respect to reagent concentration, reaction time and pH. The carefully controlled conditions which are embodied hereinafter in detailed procedures are simply and accurately reproduced at the outset of a series of tests by using a pH meter and recommended pH values given in Table I, hereinafter.

The detailed procedures are carried out in small volumetric flasks, adding the reagents with syringes equipped with Teflon needles. These should reach beneath the meniscus to insure reproducible addition and rapid mixing of the reagents.

The reagents used in the detailed analyses will now be discussed. Although distilled water is sufficiently free of urea, it readily absorbs atmospheric ammona which must be removed. Ammonia-free water is prepared by bringing distilled water to pH 8.8 with NaOH and removing the ammonia by placing water in an open container into a vacuum dessicator containing an open container of $H_2SO_4$, closing the dessicator, evacuating, and leaving for one hour.

For use in both urea and ammonia procedures, detailed hereinafter, prepared a 2.5% NaOCl solution. Also prepared a 0.2% NaOBr solution which should contain 0.75 ml. $Br_2$ and 2.0 g. NaOH per liter.

For use in the urea procedures, prepared a 0.25 N HCl solution which should contain 0.3% $MgCl_2 \cdot 6H_2O$, 0.3% KCl, 0.25% NaOH and 0.2% $H_2O_2$; 1.0 M phenol in 95% ethanol; and a solution of crystalline urea as a standard. The borate buffer solution should be prepared daily by adding 0.15 ml. of 3% $H_2O_2$ to 25 ml. of a stock solution containing the said concentrations of $H_3BO_3$, KCl and NaOH.

For use in the ammonia procedures, prepare 0.50 N HCl; 0.50 N NaOH; 0.2 N $HgCl_2$; and a solution of N $H_4Cl$ for use as a standard.

In order to remove the red oxidation products from old phenol crystals, distill in a hood using a round bottomed flask and a short air condenser. Except where noted these reagents are stable for several months if kept in glass stoppered containers.

The optimal procedures for carrying out the analyses in the more dilute solutions of urea, tyrosine and ammonia will now be discussed. The sample and reagent volumes in the following procedures are chosen to maintain the meniscus in the flask neck while permitting adequate mixing. To closely approximate the successive pH measurements in Table I hereinafter, the reagent volumes should be within 5% of those specified. For each analysis, there are three procedures which give rise to the general, blank and standard signals.

The general procedure for the analysis of urea consists of eight operations:

(1) Transfer a 20.0 ml. aliquot of the sample, colorless, free from solid matter and at temperature T to a 25 ml. volumetric flask containing a stirring magnet. Do not cavitate the sample by rapid addition as the microbubbles contribute slightly to the blank.

(2) Add 3.0 ml. of distilled water, begin to stir vigorously without a vortex, and continue stirring.

(3) Add 0.030 ml. of NaOCl reagent.

(4) After 3 to 5 seconds, add 0.50 ml. NaOBr reagent.

(5) After 1 to 2 seconds more, add $(0.30+X)$ ml. of HCl reagent. (X is the volume of HCl reagent required to titrate 0.50 ml. of NaOBr reagent to pH 7.7.)

(6) After 10 to 15 more seconds, add 0.50 ml. of $H_3BO_3$ buffer reagent.

(7) After 1 to 2 more seconds, add 0.30 ml. phenol reagent and stir for 10 to 20 seconds more.

(8) After 10 but not more than 20 minutes, compare the absorbency of the sample solution at 454 m$\mu$ against that of distilled water.

The blank procedure is slightly different from that of the general sample:

(1) Add a duplicate aliquot of the sample at T $\pm 2°$ C. to a flask without cavitation.

(2) Add 3.0 ml. of distilled water and begin to stir vigorously.

(3) Add 0.50 ml. NaOBr reagent.

(4) After 8 to 12 minutes, add 0.30 ml. NaOCl reagent.

(5) After 1 to 2 seconds more, add $(0.30+X)$ ml. HCl reagent, and continue with operation six of the general procedure.

The urea standard procedure is identical to the general procedure except that the 3.0 ml. addition of distilled water is replaced by 3.00 ml. of urea solution of known concentration, 5–25 times that of the sample. An inorganic urea solution is quite stable.

If any of the reagents are renewed, or if a particular sample differs from the previously accepted blank sample by more than 1‰ in salinity or 2° C., a separate urea blank sample should be obtained. Whenever it is found necessary to react a blank sample, a urea standard sample should also be obtained.

Tyrosine may be analyzed by the general urea procedure omitting the NaOBr addition in step 4 and the addition of the extra HCl reagent in step 5.

The urea blank procedure, omitting the NaOBr addition in step 3 and the addition of the extra HCl reagent in step 5, yields a valid tyrosine blank signal. By adding a standard quantity of tyrosine instead of urea in the modified urea standard procedure, a valid tyrosine standard signal is obtained.

The ammonia analysis differs from the urea analysis in slight pH variations as shown in Table I, in the rate of signal development, in signal linearity, and in the blank procedure. The general ammonia procedure requires eight operations:

(1) Transfer a 20.0 ml. aliquot of sample, colorless, free from solid matter, and at temperature T to a 25 ml. flask containing a stirring magnet.

(2) Add 3.0 ml. ammonia-free water and begin to stir vigorously without a vortex.

(3) Add 0.40 ml. NaOCl reagent.

(4) After 3 to 5 seconds, add 0.25 ml. HCl reagent.

(5) After 10 to 25 seconds, add 0.20 ml. NaOH reagent.

(6) After 1 to 2 more seconds, add 0.30 ml. ethanolic phenol reagent.

(7) After 3 to 5 more seconds, add 0.40 ml. NaOH reagent and stir for 10 to 20 more seconds.

(8) After 25 but not more than 35 minutes, compare the absorbency of the sample solution at 630 m$\mu$ against that of distilled water.

The ammonia blank signal is composite and is obtained by reacting a series of three solutions. The first solution (1) is an ammonia-free distilled water sample reacted by the general procedure. By comparing the distilled water blank with previous such values, the degree of ammonia contamination in the reagents may be estimated.

The ammonia contamination would not show up in blank solutions (2) and (3) because of Br$^-$ interference. Solutions (2) and (3) are aliquots of the natural sample which should be stirred for 5 to 10 minutes with 0.20 and 0.40 ml. respectively of NaOBr reagent. They should then be developed by the general ammonia procedure, adding extra acid to compensate for the alkalinity as in the urea blank procedure.

The sample blank is determined by subtracting the difference between the absorbencies (3) and (2) from (2), the lowest absorbency;

[sample blank $=(2)-((3)-(2))$]

The ammonia contribution to the blank is then corrected for the salt effect, as indicated in Table II hereinafter, and added to the sample blank to yield the true ammonia blank signal.

A separate ammonia blank and standard signal should be obtained for every sample which differs from the previously accepted blank sample by more than 2‰ in salinity and 4° C. or if any of the reagents is renewed.

The ammonia standard sample is prepared by the general ammonia procedure, replacing the 3.0 addition of distilled water by 3.00 ml. ammonia solution of known concentration. The concentration of the standard ammonia addition and the dilution of the sample, if unusually high concentrations of ammonia are found, should be chosen to keep the signals on the linear portion of the Beers' Law Curve. The standard ammonia solution is less stable than the urea solution, and should be replaced daily.

In natural samples, urea is more stable than ammonia, which is continually being produced by decay processes and is absorbed by bacteria and plant cells alike. When an ammonia sample is collected, care must be taken to avoid contamination by the atmosphere. If a sample is drawn into a twice rinsed bottle and capped immediately, it should be analyzed for ammonia within the hour if stored at 25° C. If refrigerated below 5° C., it may be stored for up to 5 hours. Although filtration further stabilized the ammonia, it increases the chances of contamination. Urea samples may be stored for longer periods. Because of the possibility of organism rupture producing anomalously high values, neither urea nor ammonia samples should be frozen without filtration.

In order to obtain the urea or ammonia concentration of the sample, the difference between the blank and general sample absorbences is divided by the difference between the general and standard sample absorbencies. Then multiply by three-twentieths the concentration of the added standard solution.

Quantitative and qualitative evaluations will now be discussed. The pH and capacity of the NaOCl-HOCl buffer solution were adjusted to maximize the urea and ammonia signals:

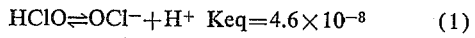

$$HClO \rightleftharpoons OCl^- + H^+ \quad K_{eq} = 4.6 \times 10^{-8} \quad (1)$$

$Cl_2$ and $Cl^-$ are also in equilibrium with HClO.

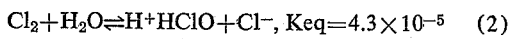

$$Cl_2 + H_2O \rightleftharpoons H^+ + HClO + Cl^-, K_{eq} = 4.3 \times 10^{-5} \quad (2)$$

Under optimal chlorination a variable decrease in color intensity is noticed when a large surface area of the reacting solution is exposed to the air. Escape of $Cl_2$ or HOCl from the acidified NaOCl solution was suspected.

When a small reproducible area was exposed in the neck of a volumetric flask after the HCl addition, the yield and precision improved markedly.

If the phenol is added directly to either chlorinating solution, the blank signals are high, and the urea signal is unstable. In the urea procedure, by first adding $H_3BO_3$ buffer, the blank is reduced and the pH raised reproducibly. In addition, the rates of color development and fading become more manageable, and the urea signal does not turn green for several hours because the conversion of yellow to blue is retarded. The presence of $OBr^-$ also eliminates the interference due to the secondary ammonia indophenol absorbency peak at 400 mμ.

Because the blue does not fade, the ammonia sample does not require such an accurately reproduced terminal pH. NaOH is added prior to the phenol to reduce the blank signal. If $H_3BO_3$ is used, the ammonia signal is non-linear even at low intensity. A larger addition of NaOH follows the phenol to increase the rate of ammonia signal development.

The rate of urea-yellow development is increased, particularly in fresh water samples, if $MgCl_2$ is added with the HCl reagent and KCl with the $H_3BO_3$ buffer. The color development is also more rapid and the precision improved between replicate samples of HOOH is added with the buffer. HOOH reacts with $OCl^-$ and $OBr^-$ to produce $O_2$, and the oxidizing conditions evidently promote color development. This last dependency lends support to the theory that the blue and yellow products are both oxidized forms of indophenol compounds.

Urea-yellow is probably also an indophenol because both the yellow and blue compounds are visual acid-base indicators with pK's of 5.0 and 8.1 respectively, and because the yellow is converted to blue in alkaline solution where the blue is more stable. The conversion could be affected if the indo-N:Carbonyl-C bond were weakened and hydrolized to form the more stable quinoid structure.

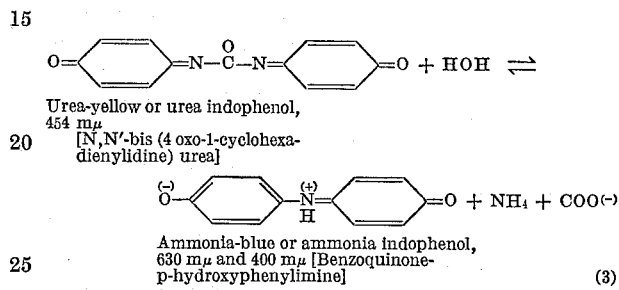

Urea-yellow or urea indophenol, 454 mμ
[N,N'-bis (4 oxo-1-cyclohexa-dienylidine) urea]

Ammonia-blue or ammonia indophenol, 630 mμ and 400 mμ [Benzoquinone-p-hydroxyphenylimine]  (3)

The urea blank procedure is valid because within 10 minutes the NaOBr reagenat oxidizes the urea, but when NaOBr is added with the other reagents (as in the general procedure) it does not diminish the urea signal. In the alkaline NaOBr reagent $Br_2$ is hydrolized:

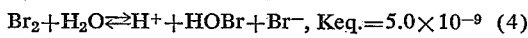

$$Br_2 + H_2O \rightleftharpoons H^+ + HOBr + Br^-, K_{eq} = 5.0 \times 10^{-9} \quad (4)$$

$OBr^-$ is in equilibrium with HOBr

$$HOBr \rightleftharpoons OBr^- + H^+, K_{eq} = 2.1 \times 10^{-9} \quad (5)$$

The $Br_2$ in the NaOBr reagent is destroyed in the urea and ammonia procedures by reaction with phenol. The slight absorbency which is added to the sample by the NaOBr is equivalent in all three urea procedures and corrected for in the ammonia blank procedure. In the ammonia analysis it is impossible to develop the blue signal in the presence of $Br^-$; however, the composite procedure as described circumvents this problem.

The stability of the signal will now be enumerated. Once the ammonia signal develops it is stable. The rate of development of the ammonia-blue increases with the increasing terminal pH, but so does the conversion of urea-yellow to ammonia-blue. Therefore, when urea is present in an ammonia sample minimal terminal pH is recommended, and the absorbency at 630 mμ should be obtained as soon as possible after maximum development.

The rates of development and fading of the urea-yellow and the rate of development of the blank signal both increase with decreasing terminal pH and increasing temperature and salinity. At 25° C. (after maximum development with the recommended procedure) the yellow fades at rates of 1–2% per hour in distilled water and 3–4% in sea water.

The blank signals never reach a maximum, but their growth can be retarded by keeping the temperature and pH of the terminal solution within the suggested limits. The pH's after the successive additions (listed in Table I) have been chosen so that the blank signal will be low, and so that all samples between 3° C. and 30° C. and between the salinities of fresh and sea water will develop optimal signals sufficiently stable for an absorbency comparison.

The temperature of the sample does not affect the magnitude of the urea signal, but with decreasing temperature, the ammonia signal increases slightly. At 3° C. the rates of development and fading of all signals are about 50% slower than at 25° C. To insure comparable development, the aliquots of the sample should be approximately isothermal when reacted.

The sensitivity of the ammonia signal decreases about 40% with increasing salinity between fresh and ocean water (evidently because of bromide ions). Newell, J. Mar. Res., 24, 201–2 (1967), suggested that mercuric ions would counter the salt effect. If a mercuric chloride reagent is mixed 1:1 with the hydrochloric acid reagent and if 0.50 ml. of the slightly turbid, combined reagent is added in place of the regular HCl addition to samples which are more than 10‰ in salinity, the salt effect will be reduced to 5%. If $HgCl_2$ is added to fresher samples, mercuric salts precipitate because of the increased activity coefficients of the ions involved.

The sensitivity of the urea reaction increases about 90% with increasing salinity from fresh water to 30‰ sea water. The increase in reaction sensitivity is due to divalent cations.

The specificity of the reactions will now be explained. It is important to test compounds which would be destroyed by the blank procedure, because if they were to produce signals at 454 or 630 m$\mu$, they would be counted as urea or ammonia. Several such nitrogen compounds were chosen for testing. In distilled water, standard samples of those compounds were reacted with the general urea procedure. The gram atom N absorbency indices in absorbency units per cm. cell times gram atoms nitrogen per liter at 454 and 650 m$\mu$ are reported to determine the specificity of the phenol-hypochlorite signals.

The general urea procedure was used for the tests because it was thought to be similar enough to the ammonia procedure to detect interferences. Negative reactions at both 454 and 630 m$\mu$ were obtained with acetamide, alanine, arginine, asparagine, aspartic acid, barbitol, caffeine, citrulline, creatine, creatinine, cystiene, cystine, diphenyl urea, glutamic acid, glutathione, glycine, hippuric acid, histidine, isoleucine, leucine, lysine, methionine, methylurea, monoethanolamine, phenylalanine, phenylurea, N-propylamine, threonine, and uracil. Following are the compounds giving positive reactions at 454 m$\mu$ which are listed with their respective gram atom-N absorbency indices: Allantoin, $1.6 \times 10^3$; biuret, $1.6 \times 10^3$; tyrosine, $1.0 \times 10^3$; urea, $2.6 \times 10^3$. Ammonia does not interfere with the urea analysis signal at 454 m$\mu$ because the NaOBr added to each sample inhibits indophenol blue development. If the NaOBr addition were omitted, the absorbency index of ammonia at 454 m$\mu$ would be $0.35 \times 10^3$, an absorbency caused by a secondary ammonia peak at 400 m$\mu$. At 630 m$\mu$ ammonia was the sole primary absorbency with an index of $5.2 \times 10^3$. Although the compounds which gave rise to absorbencies at 454 m$\mu$ (with the exception of tyrosine) do fade with time and develop a signal at 630 m$\mu$, this interference can be largely eliminated in the ammonia analysis by reading the signal promptly.

Tyrosine, allantoin, the biuret are not present in natural waters or in body fluids in concentrations which approach those of urea or ammonia. In these media, therefore, no sources of positive chemical interference are expected in either analysis.

The calibrations and precisions will now be explained. The data given in Table II, hereafter, reflects the reproducibility and the salt effect. At 1.0 $\mu$g. atoms urea-N/l., the standard deviation of a set of seven sea water absorbencies is equivalent to 0.1 $\mu$g. atoms urea-N/l. The standard deviation of the nine sea water blank samples in the sample groups of 0.5, 1.0 and 2.0 $\mu$g. atoms/l. of added urea-N is equivalent to 0.05 $\mu$g. atoms urea-N/l., and the variances sum to 0.0125 $\mu$g. atom$^2$ urea-N/l.$^2$. The estimated standard deviation of the urea-N detected at 1.0 $\mu$g. atoms/l. is therefore 0.11 $\mu$g. atoms urea-N/l. At the 95% confidence level, for a sample to be significantly different from the blank, it must contain urea equal to twice the standard deviation. The lower limit of detection of the analysis in sea water is thus 0.2 $\mu$g. atoms urea-N/l., and the estimated relative standard deviation is 10% at a urea-N concentration of 1.0 $\mu$g. atom/l.

Similarly, with the ammonia sea water data for a sample to be significantly different from the blank at the 95% confidence level, it must contain at least 0.2 $\mu$g. atoms ammonia-N/l. The estimated standard deviation at 0.5 $\mu$g. atoms ammonia-N/l. is 20%.

Other color reactions will now be discussed. As noted with regard to reaction specificity, several compounds other than ammonia and urea gave colored products when reacted by the general urea procedure. The biuret and allantoin products are thought to be identical with the urea indophenol because of similarities in absorbency and reaction characteristics. The products are probably formed when urea splits from the parent compound and would obey Beers' law as does the urea indophenol. Blank signals for allantoin and biuret may be obtained by the urea blank procedure, provided there are no interfering compounds in the system.

Another interesting signal is the tyrosine peak at 375 m$\mu$. Of all the amino acids tested, tyrosine gave the sole positive reaction; and, as shown in Table III, hereafter, the tyrosine signal is linear through 100 $\mu$g. atoms tyrosine-N/l. The distilled water tyrosine solutions were reacted by the general urea procedure excluding the NaOBr reagent. The signals develop within 2 minutes and are stable for several hours. The major interference in this region of the spectra is the secondary ammonia indophenol peak at 400 m$\mu$. OBr$^-$ or Br$^-$ may not be used to nullify the ammonia signal as in the urea analysis, because these compounds inhibit both the tyrosine and ammonia color reactions. In order to use the tyrosine analysis on natural samples, the ammonia should be removed by diffusion or some comparable method. If no ammonia is present, the urea blank procedure will produce a valid tyrosine blank signal.

Because the tyrosine-yellow is also a visual acid-base indicator with a pK of about 4, and because the Br$^-$ inhibition suggests color formation reactions similar to those of ammonia blue, they tyrosine product is probably also an oxidized indophenol.

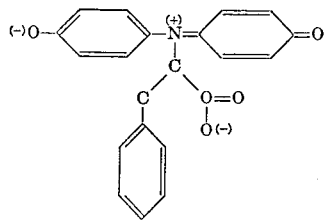

Tyrosine yellow, absorbency maximum—375 m$\mu$ benzoquinone-P-hydroxyphenylimine-N-2 [3 - hydroxyphenylpropionic acid].

The adaptation of this procedure to clinical samples will now be discussed. The urea, ammonia, and tyrosine analyses may be adapted to manual or automated analysis of blood, serum, and urine samples. Deproteinization is best accomplished by dialysis with isotonic solutions, because the reactions require a sample of near-neutral pH.

This urea method is superior to the diacetyl-monoxine method currently used for clinical samples because the color development is more rapid, the urea absorbency index is not as strongly dependent on temperature, the analyzed samples are not corrosive to the operator or the equipment, and the reaction is more specific for urea in biological fluids. This method is also more specific than the p-dimethylaminobenzaldehyde methods nesslerization techniques, and gasometric or titration methods using OBr$^-$. It also avoids the incubation necessary with enzymatic methods and the strongly acid samples of dixanthyl urea methods.

The hypochlorite-phenol-ammonia reaction has often been used for analysis of clinical samples. The present ammonia procedure is unique in that the signal develops in a less alkaline solution without heating, thereby avoiding interference from urea, biuret, and allantoin which develop an interfering absorbance at 630 mμ more rapidly in alkaline, terminal hypochlorite-phenol solutions.

This analysis is specific for tyrosine. Other methods have either been specific for tyrosine and its derivatives or have depended on the enzymatic conversion of tyrosine to phenylalanine and, therefore, analysis before and after incubation. High and low concentrations of urinary tyrosine, relative to the concentrations of metabolically related products, are indicative of tyrinosis and phenylketonuria, respectively. An analysis is suggested which chemically distinguishes tyrosine from those related compounds.

Simultaneous analysis for ammonia and urea is not particularly accurate, since at a pH which is high enough for development of the ammonia signal, the urea signal is unstable. It is convenient to perform simultaneously an ammonia-tyrosine or urea-tyrosine analysis by using the ammonia or urea procedure and determining the Δ absorbency at 375 mμ.

TABLE I

Successive pH Values

| Reagent addition | Distilled water | | Sea water | |
|---|---|---|---|---|
| | General sample* | Blank sample* | General sample* | Blank sample* |
| A. Urea procedure: | | | | |
| Original sample | 7.0 | 7.0 | 7.9 | 7.9 |
| OBr⁻ | | 11.1 | | 9.5 |
| OCl⁻ | 10.3 | 11.2 | 9.0 | 9.8 |
| HCl | | 7.7 | | 7.6 |
| HCl + OBr⁻ | 7.7 | | 7.6 | |
| H₃BO₃ | 8.3 | 8.3 | 8.1 | 8.1 |
| C₆H₅OH | 8.9 | 8.9 | 8.4 | 8.4 |
| Original sample | 7.0 | 7.0 | 7.9 | 7.9 |
| OBr⁻ | | 10.6 | | 9.4 |
| OCl⁻ | 10.5 | 10.6 | 9.1 | 9.6 |
| HCl | 7.4 | 7.4 | 7.3 | 7.3 |
| OH⁻ | 7.8 | 7.8 | 7.7 | 7.7 |
| C₆H₅OH | 8.6 | 8.6 | 8.4 | 8.4 |
| OH⁻ | 10.3 | 10.3 | 9.3 | 9.3 |

*NOTE: The pH's following the specified reagent additions of a general and a blank sample should not vary appreciably from these values.

TABLE II

Typical urea and ammonia calibration data

[These absorbencies were obtained by adding quantities of urea or ammonia solution to distilled water and aged sea water of 35°/₀₀ salinity]

| Microgram atoms/l. of added urea-N or of ammonia-N | Absorbency in distilled water in a 5 cm. cell | | Absorbency in sea water in a 5 cm. cell | | |
|---|---|---|---|---|---|
| | 454 mμ | 630 mμ | 454 mμ | | 630 mμ |
| | | | Blank sample | Standard sample | |
| 0.00 | 0.011 | 0.031 | 0.062 | 0.072 | 0.042 |
| | 0.011 | 0.033 | 0.062 | 0.063 | 0.044 |
| | 0.012 | 0.033 | 0.063 | 0.062 | 0.046 |
| | 0.012 | 0.034 | | 0.062 | 0.046 |
| | 0.010 | 0.033 | | 0.064 | 0.044 |
| | 0.011 | | | 0.065 | |
| | 0.011 | | | 0.062 | |
| 0.50 | 0.017 | 0.047 | 0.064 | 0.072 | 0.055 |
| | 0.017 | 0.047 | 0.063 | 0.074 | 0.054 |
| | 0.019 | 0.046 | 0.062 | 0.075 | 0.053 |
| | 0.018 | 0.046 | | 0.076 | 0.052 |
| | 0.017 | 0.046 | | 0.075 | 0.052 |
| | 0.017 | 0.046 | | 0.076 | 0.054 |
| | 0.018 | 0.047 | | 0.076 | 0.053 |
| | | 0.047 | | | 0.051 |
| | | 0.046 | | | 0.055 |
| | | 0.047 | | | 0.054 |
| 1.00 | 0.023 | 0.059 | 0.065 | 0.081 | 0.062 |
| | 0.023 | 0.059 | 0.063 | 0.083 | 0.060 |
| | 0.025 | 0.059 | 0.064 | 0.085 | 0.059 |
| | 0.025 | | | 0.087 | |
| | 0.025 | | | 0.086 | |
| | 0.024 | | | 0.087 | |
| | 0.025 | | | 0.087 | |
| | 0.025 | | | | |
| 2.00 | 0.039 | 0.090 | 0.066 | 0.105 | 0.081 |
| | 0.040 | 0.090 | 0.063 | 0.108 | 0.078 |
| | 0.041 | 0.089 | 0.064 | 0.106 | 0.081 |
| | 0.040 | | | 0.109 | |
| | | | | 0.104 | |
| | 0.041 | | | 0.110 | |
| | 0.039 | | | 0.109 | |
| | 0.042 | | | | |
| | 0.043 | | | | |
| 4.00 | | 0.144 | | | 0.118 |
| | | 0.148 | | | 0.113 |
| | | 0.148 | | | 0.116 |

| Microgram atoms/l. of added urea-N or of ammonia-N | Absorbency in distilled water in a 5 cm. cell | | Absorbency in sea water in a 5 cm. cell | | |
|---|---|---|---|---|---|
| | 454 mμ | 630 mμ | 454 mμ | | 630 mμ |
| | | | Blank sample | Standard sample | |
| 10.0 | 0.122 | 0.310 | 0.064 | 0.272 | 0.226 |
| | 0.120 | 0.314 | 0.063 | 0.268 | 0.222 |
| | 0.210 | 0.320 | 0.064 | 0.274 | 0.221 |
| | 0.122 | | | 0.270 | |
| | 0.119 | | | 0.267 | |
| | 0.122 | | | 0.268 | |
| | 0.121 | | | 0.269 | |
| | 0.123 | | | | |
| 20.0 | 0.231 | 0.582 | 0.063 | 0.461 | 0.397 |
| | 0.219 | 0.584 | 0.061 | 0.452 | 0.392 |
| | 0.224 | 0.591 | 0.064 | 0.455 | 0.389 |
| | 0.219 | 0.576 | | 0.449 | 0.394 |
| | 0.218 | 0.579 | | 0.465 | 0.394 |
| | 0.223 | 0.578 | | 0.467 | 0.392 |
| | 0.219 | 0.591 | | 0.462 | 0.395 |
| | 0.220 | 0.580 | | | 0.389 |
| | | 0.578 | | | 0.398 |
| | | 0.578 | | | 0.393 |
| 40.0 | 0.425 | 1.020 | 0.065 | 0.830 | 0.665 |
| | 0.420 | 1.025 | 0.064 | 0.824 | 0.655 |
| | 0.427 | 1.035 | 0.067 | 0.838 | 0.670 |
| | 0.424 | | | 0.842 | |
| | 0.425 | | | 0.846 | |
| | 0.420 | | | 0.838 | |
| | 0.428 | | | 0.846 | |
| | 0.429 | | | | |
| 80.0 | 0.834 | | 0.065 | *1.54 | |
| | 0.841 | | 0.055 | 1.54 | |
| | 0.844 | | 0.050 | 1.56 | |
| | 0.839 | | | 1.54 | |
| | 0.835 | | | 1.54 | |
| | 0.836 | | | 1.53 | |
| | 0.834 | | | 1.52 | |
| | 0.839 | | | | |
| 125 | *1.29 | | 0.051 | *2.30 | |
| | 1.28 | | 0.045 | 2.31 | |
| | 1.26 | | 0.046 | 2.33 | |
| | 1.30 | | | | |
| 250 | *2.63 | | | | |
| | 2.57 | | | | |
| | 2.63 | | | | |
| 500 | *4.95 | | | | |
| | 4.91 | | | | |
| | 4.97 | | | | |
| 1,000 | *9.25 | | | | |
| | 9.05 | | | | |
| | 9.10 | | | | |

*In these groups of samples the absorbencies were obtained in shorter cells and converted to a 5 cm. path.

TABLE III.—Typical Tyrosine Calibration Data (These absorbencies were obtained by adding quantities of tyrosine solution to tyrosine-free distilled water)

| μgram atoms/l. of added tyrosine-N | 375 mμ absorbency in distilled water in a 5 cm. cell |
|---|---|
| 0 | 0.034 |
| | 0.031 |
| | 0.033 |
| | 0.032 |
| 25 | 0.287 |
| | 0.292 |
| 50 | 0.585 |
| | 0.580 |
| 100 | 1.142 |
| | 1.130 |

Obviously many modifications and variations of the present invention are possible in light of the above teachings. It is therefore, to be understood that within the scope of the appended claims the invention may be practiced otherwise than as specifically described.

What is claimed is:

1. A process for determining in an aqueous sample the content of nitrogen containing compounds from the group consisting of urea and tyrosine, through chemical reaction and spectoral absorbancy determination, the process comprising the following steps:
    (1) mixing said aqueous sample at a pH between 4.0 and 8.0 with a solution containing free chlorine; and
    (2) mixing the resultant solution of step 1 between a pH of 8.0 and 11.0 with a phenol solution; and (3) determining the absorbancy of the resultant solution of step 2 substantially in the 454 m$\mu$ and in the 375 m$\mu$ region of the spectrum; and (4) comparing the resultant absorbancy of step 3 at 454 m$\mu$ with a standard urea sample, and the resultant absorbancy of step 3 at 375 m$\mu$ with a standard tyrosine sample.

2. A process for determining in an aqueous sample the content of nitrogen-containing compounds from the group consisting of urea and ammonia through chemical reaction and spectoral absorbancy determination, the process comprising the following steps:

(1) mixing an aqueous sample at a pH of between 4.0 and 8.0 with a solution containing $(1 \times 10^{-2 \pm 1})\%$ free chlorine; and (2) mixing the resultant solution of step 1 with $(1 \times 10^{-1 \pm 2})\%$ phenol; and (3) waiting at least 2.5 minutes for a urea signal to appear, and at least 5 minutes for an ammonia signal to appear and then determining the absorbancy of the resultant solution of step 2 in substantially the 454 m$\mu$ and the 630 m$\mu$ regions of the spectrum; and (4) comparing the resultant absorbancy of step 3 at 630 m$\mu$ with a standard ammonia sample, and the resultant absorbancy of step 3 at 454 m$\mu$ with a standard urea sample.

3. A process for determining in an aqueous sample the content of nitrogen-containing compounds from the group consisting of urea and tyrosine, through chemical reaction and spectoral absorbancy determination, the steps of the process being as follows:

(1) transfer a 20.0 ml. aliquot of the sample, colorless, free from solid matter to a 25 ml. volumetric flask;

(2) add 3.0 ml. of distilled water, begin to stir vigorously without a vortex, and continue stirring;

(3) add 0.30 ml. of NaOCl reagent;

(4) after 4 to 6 seconds more, add 0.30 ml. of HCl reagent;

(5) after 10 to 15 more seconds add 0.50 ml. of $H_3BO_3$ buffer reagent;

(6) after 1 to 2 more seconds, add 0.30 ml. phenol reagent and stir for 10 to 20 seconds more;

(7) after 10 but not more than 20 minutes, determine the absorbancy of the resultant solution of step 6 at 454 m$\mu$ and 375 m$\mu$; and (8) comparing the resultant absorbancy of step 7 at 454 m$\mu$ with a standard urea sample, and the resultant absorbance of step 7 at 375 m$\mu$ with a standard tyrosine sample.

References Cited

Noble, E. D.: Anal. Chem. 27, #9, September 1955, 1413–1416.

Bolleter et al.: Anal. Chem. 35, No. 4, April 1961, 592–594.

Hoseney et al.: Anal. Chem. 36, No. 11, October 1964, 2145–2148.

MORRIS O. WOLK, Primary Examiner

R. M. REESE, Assistant Examiner

U.S. Cl. X.R.

23—230 B